(12) United States Patent
Kollakowski (10) Patent No.: US 9,221,549 B2
(45) Date of Patent: Dec. 29, 2015

(54) METHOD AND SYSTEM FOR DISPLAYING INFORMATION ON A DISPLAY UNIT IN AN AIRCRAFT CABIN

(71) Applicant: Airbus Operations GmbH, Hamburg (DE)

(72) Inventor: Malte Kollakowski, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 198 days.

(21) Appl. No.: 13/742,746

(22) Filed: Jan. 16, 2013

(65) Prior Publication Data

US 2013/0120163 A1 May 16, 2013

Related U.S. Application Data

(63) Continuation of application No. PCT/EP2011/003618, filed on Jul. 19, 2011.

(60) Provisional application No. 61/365,851, filed on Jul. 20, 2010.

(30) Foreign Application Priority Data

Jul. 20, 2010 (DE) .......................... 10 2010 027 709

(51) Int. Cl.
*G08B 21/00* (2006.01)
*B64D 45/00* (2006.01)
*B64D 11/00* (2006.01)

(52) U.S. Cl.
CPC ............... *B64D 45/00* (2013.01); *B64D 11/00* (2013.01); *B64D 2045/007* (2013.01)

(58) Field of Classification Search
USPC .............................. 340/945, 971; 701/3, 9, 14
See application file for complete search history.

(56) References Cited

U.S. PATENT DOCUMENTS

| | | | |
|---|---|---|---|
| 6,544,200 B1 * | 4/2003 | Smith et al. .................... | 600/595 |
| 2002/0183891 A1 | 12/2002 | Ostro | |
| 2003/0160706 A1 | 8/2003 | Endress | |
| 2005/0162396 A1 | 7/2005 | Meckesheimer | |
| 2006/0095249 A1 * | 5/2006 | Kong et al. ....................... | 704/7 |
| 2009/0112378 A1 * | 4/2009 | Robb et al. ......................... | 701/3 |
| 2010/0245130 A1 | 9/2010 | Stoll | |
| 2013/0346550 A1 * | 12/2013 | Higgins ......................... | 709/217 |

FOREIGN PATENT DOCUMENTS

| | | |
|---|---|---|
| DE | 102 07 641 | 9/2003 |
| DE | 10 2005 049 688 | 4/2007 |
| DE | 10 2007 011 208 | 9/2008 |
| DE | 10 2007 052 671 | 5/2009 |
| WO | 2008/036539 | 3/2008 |

* cited by examiner

*Primary Examiner* — Brent Swarthout
(74) *Attorney, Agent, or Firm* — Dickinson Wright PLLC

(57) ABSTRACT

A method and system for displaying information on an electrical display unit in an aircraft cabin including a generating unit for generating at least one signal which clearly identifies the information, a first acquiring unit for wirelessly acquiring the at least one signal and a control unit for controlling the display unit on the basis of the at least one signal. The system may also have a second acquiring unit for acquiring departure and/or arrival location information relating to a flight and a third acquiring unit for acquiring passenger information.

13 Claims, 5 Drawing Sheets

METHOD AND SYSTEM FOR DISPLAYING INFORMATION ON A DISPLAY UNIT IN AN AIRCRAFT CABIN

CROSS REFERENCE TO RELATED APPLICATIONS

This application is entitled to and claims the benefit of German Application No. DE 10 2010 027 709.6 and U.S. Provisional Application No. 61/365,851, both filed Jul. 20, 2010, the disclosures of which, including the specification, drawings and abstract, are incorporated herein by reference in their entirety.

FIELD

The invention relates to a method and a system for displaying information on a display unit in an aircraft cabin.

BACKGROUND

In aircraft cabins of modern airliners there is a plurality of inscriptions, notices and markings. These are mostly printed signs or stickers, which are mounted or stuck up inside the aircraft cabin. A notice with the English writing "Life vest under the seat" is thus normally mounted on the passenger seats. Furthermore, a sign in English, "Be careful when opening the overhead compartment", is usually mounted on the luggage compartment above the passenger seats. A "Vacant" sign in English that is visible when the toilet is free is also replaced by an "Occupied" sign in English by locking of the toilet door. Furthermore, a host of inscriptions are located in the galley, such as notices referring to the fixing of galley elements during the take-off and landing of the aircraft.

Moreover, storage spaces are usually provided in the galley of an airliner in which portable transport containers, so-called "trolleys", can be parked. The trolleys have holding devices that can be inserted and withdrawn and are loaded with service products required for supplying the passengers on board the aircraft, such as e.g. food or beverages. Furthermore, there are often trolleys on airliners with holding devices loaded with products for duty-free purchase. Attached to the trolleys are machine-readable identification means, so-called "bar codes", which identify the trolleys and the foods or products located in the trolleys.

It is disadvantageous in the case of the known signs, inscriptions and bar codes, however, that the information displayed cannot be changed. To change the information displayed, the sign or the bar code has to be replaced by a new sign or a new bar code. Such a change can be necessary if the information displayed in the respective language is not understood by the cabin crew and/or the passengers on the basis of their linguistic knowledge. Since airlines have to utilise their airliners to the best possible capacity on account of increased cost pressure, it can happen that an airliner fitted out with signs in German is used for a certain period in regular service in South America, so that all signs in the aircraft cabin have to be replaced for the set period by Spanish signs. This exchange is associated with a relatively high time and financial outlay, however. The bar code can change even on trolleys, so that the sticker with the printed bar code has to be painstakingly removed from the trolley and replaced by a new sticker.

The publication DE 10 2005 049 688 A1 discloses an RFID (Radio Frequency Identification) system for monitoring the transport and storage conditions of goods accommodated in a trolley. The trolley is fitted with an RFID transponder, which enables airline companies to determine the current location of the trolley by means of suitably positioned transmit-receive units. If the trolley is in a storage space in the galley of an aircraft, then information data of the RFID transponder read out by a reader is displayed via a display unit installed separately in the galley.

SUMMARY

The object of the invention is to provide a method and a system for displaying information on an electrical display unit in an aircraft cabin, which permits a flexible display of information in the aircraft cabin.

This object is achieved by a method for displaying information on an electrical display unit in an aircraft cabin with features of attached claims, and a system for displaying information on an electrical display unit in an aircraft cabin with features of attached claims.

The method according to the invention for displaying information on an electrical display unit in an aircraft cabin comprises the method steps generating at least one signal unambiguously identifying the information, acquiring, in particular wireless acquiring, of the at least one signal, controlling the display unit on the basis of the at least one signal and displaying the information on the electrical display unit. The electrical display unit can be any type of electrical display means that facilitates a representation of different information, for example different written information. Preferably it is a display device based on organic light emitting diodes, OLEDs, which guarantees a clear display even in bright ambient light or half-light. Furthermore, display units based on OLED technology can be formed to be bendable or flexible, so that the electrical display unit can easily be attached to a non-level surface. The electrical display unit can also be a so-called "electrical paper" (e-paper), which works on the principle of electrophoresis. The information displayed on the electrical display unit can be any type of information, such as characters, symbols, graphics, animations or films. In a preferred embodiment, the information displayed is a sentence consisting of characters. Various or several signals unambiguously identifying the information can thus be generated and then acquired. The signal unambiguously identifying the information can be any type of technical signal that is in suitable for a communication, such as an electrical signal, for example, a radio signal, a light signal and the like. In particular, the signal generated can be acquired wirelessly via an air interface. Depending on the signal acquired, the electrical display unit is controlled to display the desired information. A flexible, i.e. dynamic and individually variable display of information, in particular of written information, is thereby facilitated on the electrical display unit. Consequently no exchange of the display unit is necessary to change the information displayed.

Passengers of different nationalities or passengers with different linguistic knowledge are conveyed in modern airliners. Thus there are passengers who only speak their mother tongue and do not understand written signs in another language. This can be hazardous, however, especially when warning signs in emergency situations of the aircraft are involved, for example a reference to an emergency exit in the event of an emergency landing. Furthermore, on intercontinental flights the problem often arises that the language spoken at the location of the departure airport differs from the language spoken at the location of the destination airport. There are also a number of countries in which several languages are spoken as the official language. Moreover, to better utilise airliners to capacity, these are deployed on constantly changing flight routes. Thus it can occur that an aircraft shuttles between Germany and the USA in a certain period and then is only used in the People's Republic of China, due to which the main linguistic knowledge of the passengers and flight attendants changes. In such a case it is necessary to change the language of the written information to be displayed and adapt it to the languages predominantly spoken by the passengers and flight attendants. To solve this problem, written information can be displayed in different languages, in particular alternating between different languages. It is thus possible, for example, for the written information to be displayed alternately only in German for ten seconds and only in English for ten seconds. Other display time intervals are conceivable. In particular, the display time intervals for the respective languages can change, such as for example ten seconds only in German, ten seconds only in English, eight seconds only in German, eight seconds only in English etc. In the case of simultaneous display of the written information in at least two languages, the display positions can also change according to the time intervals on the display unit. A simultaneous display of the written information in several languages and a display of the written information in just one language can also alternate, in particular with different time intervals. Due to the mode of operation described, a higher probability exists that the information displayed is understood by the passengers and the flight attendants. Any conceivable representation can be used in the alternating display. For example, a following display in another language can be realised by fading or with the aid of a ticker, so that both pieces of written information are visible in some cases. It is also conceivable that the written information is always displayed simultaneously in the various languages. An alternating display is always advisable if a relatively small is display unit (for example a display unit for just one line of writing) is used.

To increase the probability still further that passengers and flight attendants understand written information displayed, departure and/or arrival location information of a flight can be taken into account in the display of the written information. The departure and/or arrival location information can be any information concerning a departure or arrival location of a flight, such as the language predominantly spoken at the locations, for example. Thus the departure and/or arrival airport of an imminent flight can be acquired or taken into account and the language(s) spoken in the departure and arrival airport can be used in the choice of language for the display of the written information. The acquiring of the departure and/or arrival location information can be carried out automatically by a computer system integrated in the aircraft, for example after the flight route for navigation has been entered into the computer system by a pilot. It is also conceivable that the acquiring of the departure and/or arrival location information is carried out by an external computer system or the departure and/or arrival location information is entered into the computer system by a flight attendant via an input device (for example a keyboard). Furthermore, it is conceivable that information to be displayed is only provided or acquired in a first language and a translation module (integrated into the computer system, for example) translates the information into a second language depending on the information acquired. The written information can then be displayed alternating between the first language and the second language. The method can also comprise more than two languages. Consequently the method according to the invention can comprise the steps acquiring of departure and/or arrival location information of a flight and displaying of the written information depending on the departure and/or arrival location information acquired in various languages.

To adapt the display of the written information on the electrical display unit even more individually to the needs of the passengers, the method can also comprise the steps acquiring of passenger information and displaying of the written information depending on the passenger information acquired in various languages. The passenger information acquired can thus involve a correlation between a passenger seat and a passenger nationality and/or a passenger language. The written information can be displayed depending on the passenger information (i.e. the mother tongue spoken by a passenger) and a further language (for example the company language of the airline). If for example the passenger information comprises data according to which a passenger checked in for a certain passenger seat is of Chinese nationality or has Chinese as their mother tongue, the written information can be displayed to the passenger alternately in the main language English and the mother tongue Chinese. It is also possible that for selection of a second language apart from a main language (e.g. the main language of the airline), a plurality of passenger information (in particular all passenger information of a flight) is evaluated and the second language determined depending on the evaluation. If the processing or evaluation of the passenger information of all passengers checked in for a flight reveals for example that 90% of the passengers are Chinese, 5% of the passengers are Germans and 5% of the passengers are Americans, the written information can be displayed additionally in Chinese as well as the airline's main language English. If 80% on the aircraft are Italians, however, the second language can be Italian. The passenger information can also be information acquired by the airline on check-in. Alternatively or in addition, it can also be information that is known to the airline on account of another service. For example, a language can be used for the passenger information that a passenger has used when accessing a flight ticket booking system or a frequent flyer programme of the airline via the Internet. The passenger information acquired can be entered into the system of the present invention via a data store, a wireless or a wired connection. If desired, a flight attendant can also enter the passenger information manually into the system, for example via an input terminal. In a preferred embodiment, the display unit is mounted on a passenger seat and the written information is displayed in different languages as a function of the acquired passenger information of a passenger assigned to the passenger seat. The display unit can generally be mounted at any position on the passenger seat. If the passenger information acquired comprises data, for example, according to which a passenger of Brazilian nationality is sitting in passenger seat 22C, or a passenger who booked his flight on the airliners website in Portuguese is sitting in seat 22C, then the display unit shows alternately in English and Portuguese that the life vest is located under the passenger seat.

If desired, a display duration of the written information in the respective language can be controlled depending on the information acquired. If the acquired information comprises data, for example, according to which the flight is an inter-Arabian flight between two Arab states, the written information can be displayed for longer in Arabic than in English. In particular, the time interval during which the written information is displayed in a first language can be greater (in particular two, three or is four times greater) than the time interval during which the written information is displayed in a second language. To this end it can be determined depending on the acquired information that the first language is more important for the passenger than the second language. The written information can thus be displayed, for example, only in Arabic for ten seconds and only in English for five seconds in alternation. Other time intervals, in particular changing time intervals, are conceivable. Depending on the information acquired, priorities can be assigned to the languages, furthermore. The higher the priority assigned to the language, the longer the written information is displayed in the respective language.

In a further preferred embodiment, the electrical display unit is mounted externally on a transport container, for example a trolley. In this embodiment, the at least one signal unambiguously identifying the information can be generated by a transponder, which is mounted on a holding device, for example a tray, in the transport container. The transponder can be an RFID transmitter in particular. The signal generated can be acquired wirelessly by a reader, which is fitted in the transport container. The display unit, which is mounted on the outside of the transport container, can display the information accordingly. If a holding device is located in the transport container, this status is displayed outside on the display unit. Accordingly, removal of a holding device from the transport container is displayed in real time on the display unit. The display unit consequently always displays the latest loading status of the transport container. For this reason there is no need for the cabin crew to open the transport container to check which foods or products are located in the transport container.

This is advantageous in particular if foods are cooled or heated in the transport container, so that unnecessary opening of the door of the transport container is avoided. Consequently less cold or heat escapes into the interior of the cabin.

The system according to the invention for displaying information on an electrical display unit in an aircraft cabin has an electrical display unit, which is adapted to display the information, a generating unit, which is adapted to generate at least one signal unambiguously identifying the information, a first acquiring unit, which is adapted to acquire (in particular wirelessly) the at least one signal and a control unit, which is adapted to control the display unit on the basis of the at least one signal.

The generating unit can be any type of signal generating unit such as an RFID transponder, a radio transmitter (e.g. Wireless Local Area Network (WLAN), Bluetooth, ZigBee etc.), which can generate a technical signal, which can in particular be transmitted wirelessly. Correspondingly, the first acquiring unit can be a receiver, for example a reader or a radio receiver, which is adapted to acquire the signal in particular wirelessly. Cable transmission between the generating unit and the first acquiring unit is likewise conceivable. The control unit can be any type of controller, such as a microprocessor, for example, which is connected to the first acquiring unit and the display unit and controls the display unit on the basis of the signal acquired. Furthermore, the first acquiring unit, the control unit and the electrical display unit can be formed integrally, i.e. in a module. In particular, the first acquiring unit and the control unit can be integrated in the display unit.

The control unit can further be adapted to control the display unit in such a way that this displays written information in various languages, in particular alternating between various languages, To do this, the control unit can receive at least one corresponding signal from the generating unit via the first acquiring unit. It is also conceivable that the control unit, on the basis of the signal acquired, processes the signal and on the basis of the result of processing activates the display unit to display the written information in various languages. The control unit can thus be signalled by the generating unit via the first acquiring unit, for example, that the written information "Life vest under the passenger seat" is to be displayed in English and German. It is also possible that the generating unit signals to the control unit via the first acquiring unit that the written information "Schwimmweste Linter dem Sitz" ("Life vest under the seat") is to be displayed on the display unit, with this written information additionally to be displayed in English. The control unit can accordingly translate the written German information into English (for example using a translation module based on a database) and then display the written information alternately in German and English on the display unit. A corresponding translation module can also be integrated in the generating unit.

The system can also have a second acquiring unit for acquiring departure and/or arrival information of a flight, wherein the second acquiring unit is adapted to generate at least one signal unambiguously identifying the written information in various languages depending on the departure and/or arrival location information acquired. The second acquiring unit can be any type of data receiver, data store and/or data source that can be used for data acquiring. For example, it can be a computer with a connected storage medium, which receives the departure and/or arrival location information of a flight via a wireless or wired connection, or an input unit.

The system can further have a third acquiring unit for the acquiring of passenger information, wherein the third acquiring unit is adapted to generate at least one signal unambiguously identifying the written information in various languages depending on the passenger information acquired. The third acquiring unit can be formed like the second acquiring unit. In particular, the second and the third acquiring unit can be integrated in one unit or form one unit.

According to a preferred embodiment, the display unit is mounted on a passenger seat, wherein the acquired passenger information comprises a correlation between a passenger seat and a passenger nationality and/or a passenger language. This correlation can be made in particular by a data record in a database. Alternatively, the display unit can also be assigned to a passenger seat, for example mounted on the roof lining above a passenger seat.

Furthermore, the generating unit can be adapted to generate a time control signal depending on the information acquired, which signal comprises a display duration of the written information in the respective language on the display unit. Alternatively or in addition, the time control signal can also be generated by the control unit on the basis of the information acquired.

Furthermore, the system can have a transport container with at least one holding device, wherein the generating unit is a transponder, which is fitted on the holding device in the transport container, the first acquiring unit is a reader, which is fitted in the transport container and acquires the at least one signal wirelessly, and the display unit is mounted on the outside of the transport container.

In particular, the present invention relates to a transport container with a system according to the invention for displaying information on an electrical display unit. The transport container is preferably a portable trolley.

According to a further embodiment, at least one key can be provided on the display unit, with the aid of which different operating modes can be selected. It is thus conceivable to change from an alternating display mode to a display mode with just one language by operation of the key. The written information is preferably displayed continuously or with a longer time interval in the language in which the written information was displayed on key operation.

BRIEF DESCRIPTION OF THE DRAWINGS

Preferred embodiments of the invention are now explained in greater detail with reference to the enclosed schematic drawings, in which.

DETAILED DESCRIPTION

Figure 1:
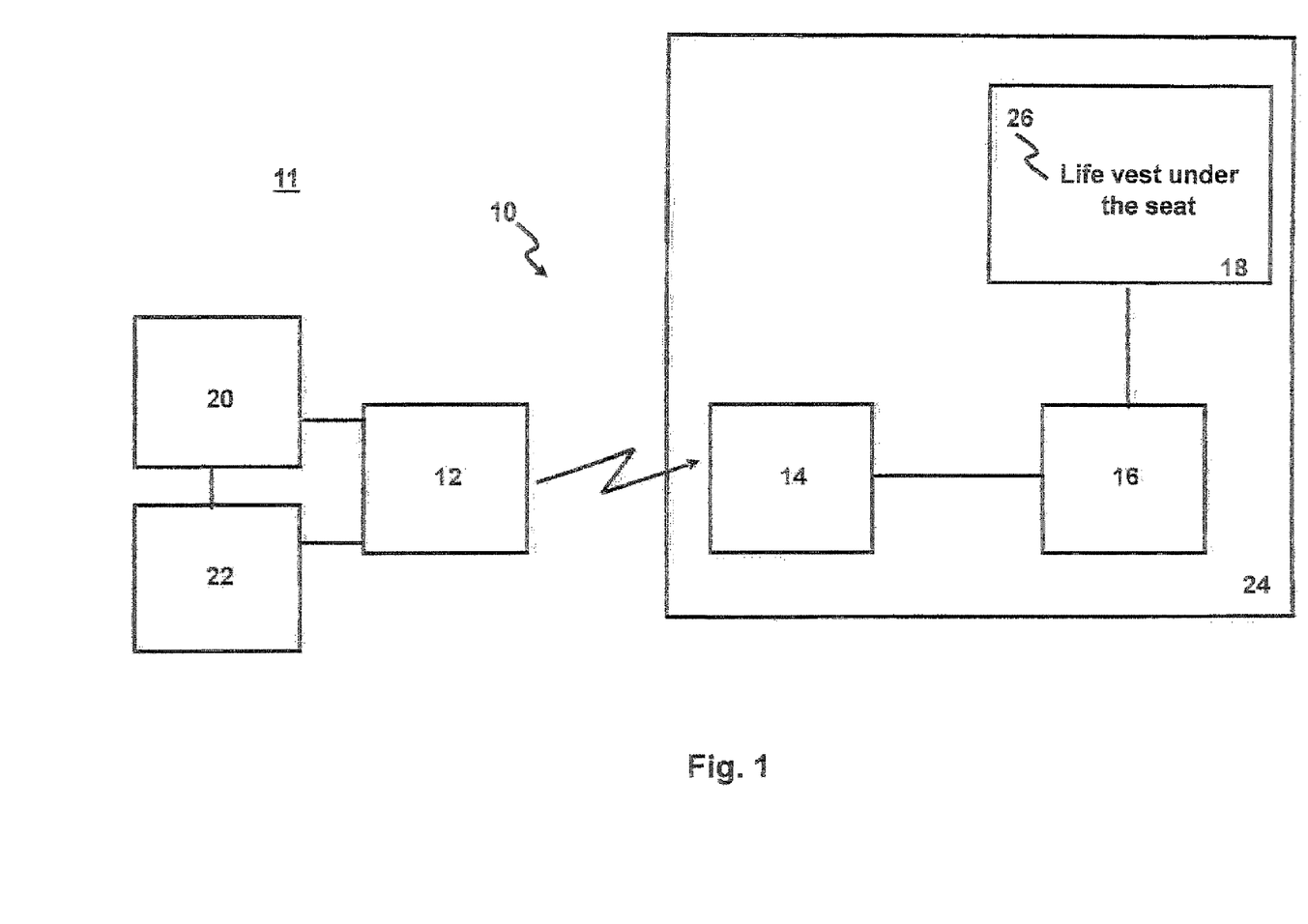
FIG. 1 shows a view of an embodiment of a system for displaying information on an electrical display unit in an aircraft cabin in a first operating mode.
Figure 2:
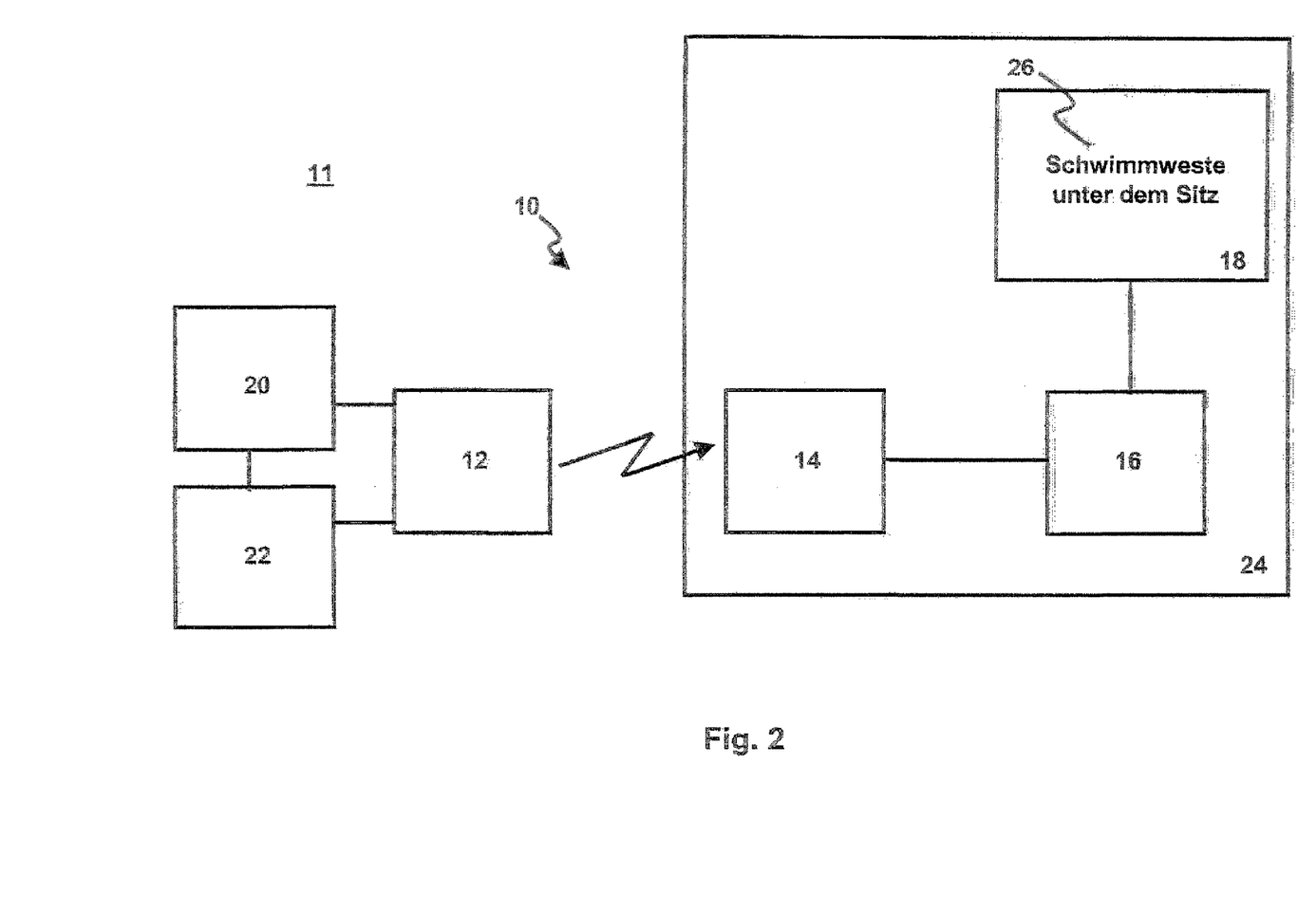
FIG. 2 shows a view of the embodiment in FIG. 1 in a second operating mode.

An embodiment illustrated in FIGS. 1 and 2 of a system 10 for displaying information on an electrical display unit in an aircraft cabin 11 comprises a generating unit 12 for generating at least one signal unambiguously identifying the information to be displayed, a first acquiring unit 14 for the wireless acquiring of the at least one signal, and a control unit 16 for controlling a display unit 18 on the basis of the at least one signal acquired. Furthermore, the system 10 can have a second acquiring unit 20 for acquiring departure and arrival location information of a flight and a third acquiring unit 22 for acquiring passenger information. The first acquiring unit 14, the control unit 16 and the display unit 18 can be integrated in one module 24.

Written information 26 is preferably displayed on the display unit 18. The display unit 18 is an OLED display, which facilitates a satisfactorily legible display of the written information 26 even in bright light conditions. The display unit 18 can also be any other type of electrical display unit, such as a Liquid Crystal Display (LCD), for example. The display unit 18 is controlled by the control unit 16. The control unit 16 is a microprocessor, which controls the display of written information 26 on the display unit 18. The control unit 16 can also be integrated in the display unit 18. To control the display unit 18, the control unit 16 receives data from the first acquiring unit 14, on the basis of which the control unit 16 activates the display unit 18.

In the present embodiment, the first acquiring unit 14 is a WLAN receiver. The generating unit 12 is accordingly a WLAN transmitter. The present invention is not restricted to WLAN technology, however, thus any radio technology (e.g. Bluetooth, ZigBee etc.) can generally be used that permits a wireless data transmission between the generating unit 12 and the first acquiring unit 14. Since the system 10 is used in an aircraft, a radio technology with lower transmission outputs is preferably used, so that electrical instruments of the aircraft are not influenced. If desired, bidirectional data communication can take place between the generating unit 12 and the first acquiring unit 14. It is also conceivable for the communication between the generating unit 12 and the first acquiring unit 14 to be realised in a wired manner. Furthermore, the generating unit 12 can also be connected to a plurality of first acquiring units (not shown). Moreover, it is conceivable that the first acquiring unit 14 transmits signals and data received from the generating unit 12 to at least one further first acquiring unit (not shown). The first acquiring unit 14 can thus be used additionally as a repeater, due to which high transmission outputs in the aircraft to bridge large distances between transmitter 12 and receiver 14 can be avoided.

The second acquiring unit 20 and the third acquiring unit 22 are connected to the generating unit 12. Optionally the second acquiring unit 20 and the third acquiring unit 22 are connected to one another. The second and the third acquiring unit 20, 22 can be any type of data source (such as e.g. a data store, an input unit, a network connection (for example to the Internet), a connection to a computer system (such as an on-board computer), etc.). In particular, the second and the third acquiring unit 20, 22 can be integrated in one unit.

The display unit 18 is mounted on a passenger seat (not shown). If desired, the module 24 comprising the first acquiring unit 14, the control unit 16 and the display unit 18 can be mounted on the passenger seat. The display unit 18 is preferably on the passenger seat in a manner such that a passenger can read it when located in the passenger seat. The display unit 18 can also be mounted at any other point in the aircraft cabin, however, for example on the cabin ceiling, on the cabin wall, on the floor, in a galley, on a trolley or on a door. If the OLED display unit 18 is formed flexibly, it can be mounted easily on a non-level surface. Space can be saved additionally by placing the OLED display unit 18 on the non-level surface. Furthermore, the generating unit 12, the second acquiring unit 20 and the third acquiring unit 22 are provided at a location separate from the passenger seat in the aircraft.

A practical example of a method for displaying written information on the display unit 18 is now explained with reference to FIGS. 1 and 2. In this practical example, the second acquiring unit 20 acquires that the departure location of a forthcoming flight is Hamburg and the arrival location is New York. The second acquiring unit 20 receives this information from the on-board computer of the aircraft (not shown), to which the second acquiring unit 20 is connected. The second acquiring unit 20 then transmits the departure and arrival location information Hamburg and New York to the WLAN transmitter 12. The WLAN transmitter 12 generates a signal corresponding to the departure and arrival location information and transmits this via an air interface to the WLAN receiver 14. The signal received by the WLAN receiver 14 is forwarded to the control unit 16, which as a function of the signal controls the display unit 18 such that the written information 26 "Life vest under the seat" (see FIG. 1) and "Schwimmweste unter dem Sitz" (see FIG. 2) is displayed alternately on the latter. It is also conceivable for a plurality of signals to be generated and transmitted for the alternating display of the two items of written information 26. Furthermore, the second acquiring unit 20 or the control unit 16 can assign a language corresponding to the location respectively to the departure and arrival location information. This information can be obtained from a database. Thus the language German can be assigned to the departure location Hamburg and the language English assigned to the arrival location New York. In this case, the signal transmitted by the WLAN transmitter 12 can contain only the language information German and English and not the information Hamburg and New York.

If it is then acquired by the second acquiring unit 20 for a further forthcoming flight that the departure airport is New York and the arrival airport is Beijing, a corresponding signal is transmitted by the second acquiring unit via the WLAN transmitter 12 and the WLAN receiver 14 to the control unit 16. The control unit 16 controls the display unit 18 accordingly so that the written information 26 is displayed alternately in English and Chinese. A higher probability is consequently achieved that passengers and flight attendants understand the written information 26 displayed on the display unit 18. This is of great importance in particular if the display unit 18 displays safety information, such as the information shown in FIGS. 1 and 2 in respect of the life vest or with reference to an emergency exit. According to a further development, the written information 26 can be displayed exclusively in an emergency situation alternating between different languages.

So that passengers understand the written information 26 with an even higher probability, the third acquiring unit 22 can acquire passenger information. The third acquiring unit 22 can be formed like the second acquiring unit 20. A clear correlation between a passenger seat and a passenger nationality and/or a passenger language can be involved in the case of the passenger information. The passenger information can be supplied to the third acquiring unit 22 by a unit outside the aircraft (for example a computer system). In this case, the third acquiring unit 22 can be a data store or a database. It is also conceivable for the third acquiring unit 22 to be a receiver (for example a wireless receiver), which is connected to an external transmitter (not shown). A signal corresponding to the passenger information is transmitted by the WLAN transmitter 12 via the WLAN receiver 14 to the control unit 16. For example, the display unit 18 is mounted on the passenger seat 22C and the passenger information includes the fact that the passenger checked in on passenger seat 22C is of Chinese nationality. The departure and arrival location information acquired by the second acquiring unit 20 also includes the fact that the flight is going from New York to Beijing. In this case, the control unit 16, following receipt of the signals from the second and third acquiring unit 20, 22, controls the display unit 18 such that the written information 26 is displayed alternately in English and Chinese. Since the passenger checked in on passenger seat 22C is of Chinese nationality, there is a high probability that he understands Chinese better than English. The control unit 26 can accordingly activate the display unit 18 such that the written information 26 is displayed for longer in Chinese than in English. For example, the written information 26 is displayed for ten seconds in Chinese and for five seconds in English. Due to this individualisation of the display, the passenger receives a higher valuation. In particular, the passenger information can contain the name of the passenger and additionally or alternatively the name of the passenger can be displayed on the display unit 18. Different ways of writing the name can accordingly be displayed alternately, for example the name in Latin and Chinese characters.

The intelligence to decide on the languages to be displayed and/or the duration of the display can be integrated in any of the units 12, 14, 16, 18, 20 and 22. The control unit 16 can thus evaluate all data and signals received and control the display unit 18 on the basis of this evaluation. Furthermore, the units 12, 20 and/or 22 can also evaluate the data and transmit a corresponding signal to the control unit 16, so that the control unit 16 only executes commands to display the written information 26 on the display unit 18.

According to a further development of the preceding embodiments, a display unit 18 or a module 24 can be mounted on each of the passenger seats installed in the aircraft cabin. The WLAN transmitter 12 can accordingly transmit control signals for the individual activation of each of the plurality of display units 18 to each of the plurality of modules. It is also conceivable for the WLAN transmitter 12 to transmit signals to a plurality of modules 24 mounted at various points in the aircraft cabin.

According to a further embodiment, the third acquiring unit 22 records passenger information of all passengers checked in for a flight. This passenger information is then processed in the third acquiring unit 22. The processing can thus reveal that chiefly Russian passengers are checked in for the flight. In addition, the third acquiring unit 22 receives from the second acquiring unit 20 the information that the flight is going from Saint Petersburg to New York. The third acquiring unit 22 accordingly transmits to the control unit 16 control data, which cause the display unit 18 to display the written information with a longer time interval in Russian and with a shorter time interval in English.

To provide the written information in various languages, one of the units 12, 14, 16, 18, 20 or 22 can comprise a database-based translation module (not shown), which automatically translates written information 26 from a first language into a second language. If the second or third acquiring unit 20, 22 acquires, for example, that written information 26 is to be displayed in German and English, where the written information 26 is only present in German, the translation module translates the written information 26 into English, so that this is displayed alternately in German and in English.

Furthermore, a key (not shown) can be mounted on the module 24 or the display unit 18, which key permits a change of display operating mode. For example, when the key is operated a change can take place from an alternating language mode to a more singular language mode.

Use of the system to display information on an electrical display unit in a trolley 30 in an aircraft cabin 11 is illustrated below with reference to FIGS. 3 to 5. The system can be the system 10 shown in FIGS. 1 and 2 or another system.

Figure 3:
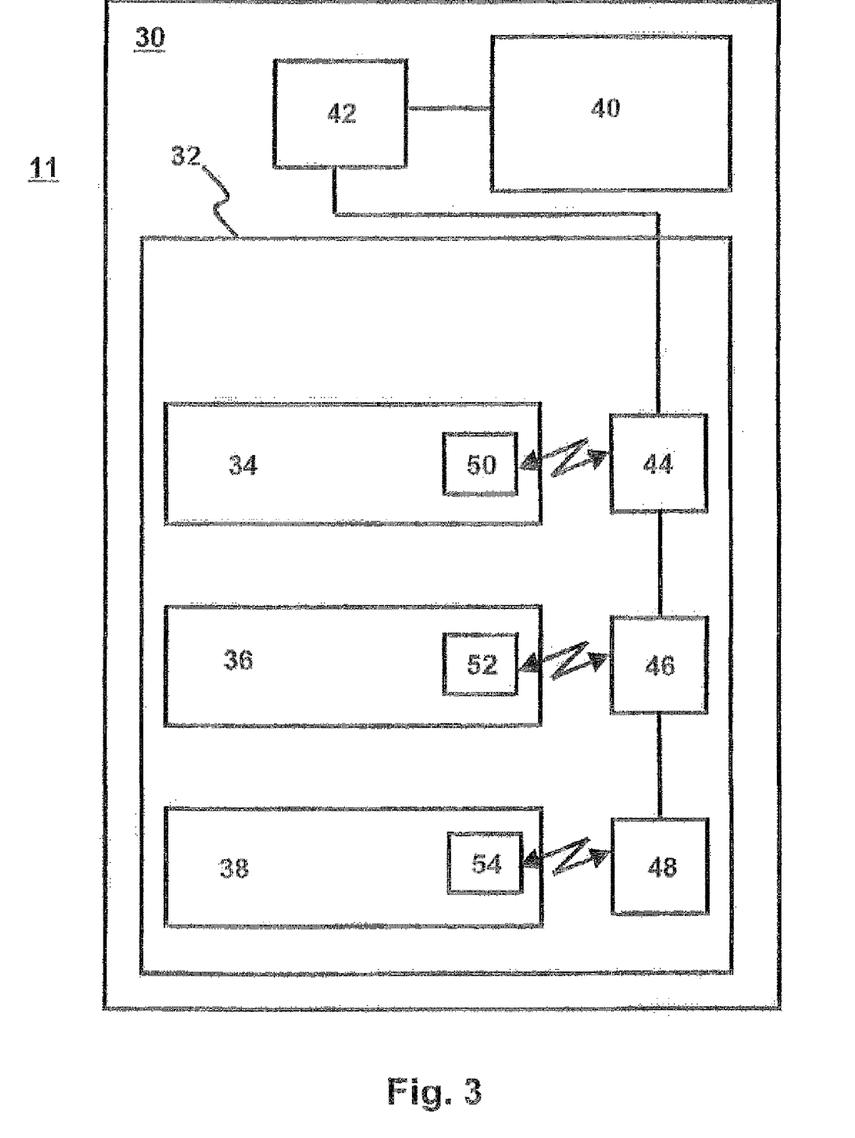
FIG. 3 shows a front view of an embodiment of a trolley with a system for displaying information on an electrical display unit.
Figure 4:
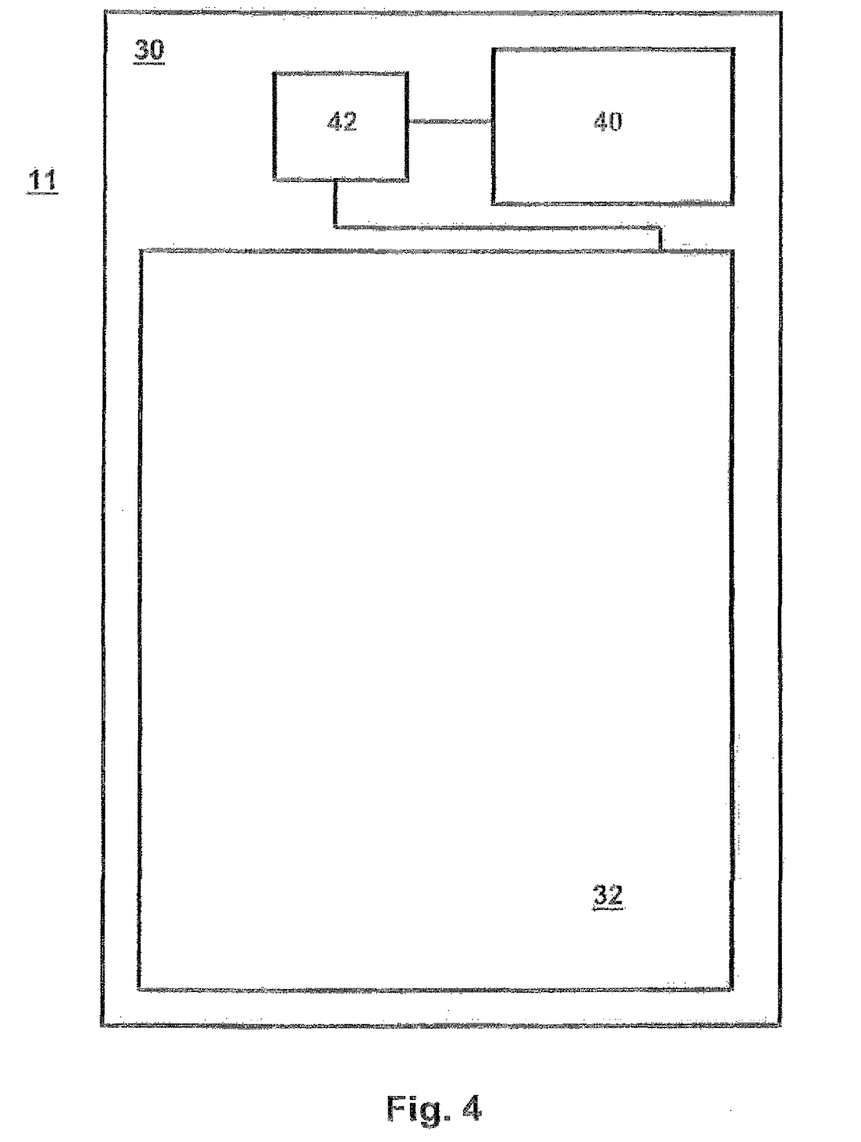
FIG. 4 shows a front view of the trolley in FIG. 3 when the door is closed and FIG. 5 shows a front view of the trolley in FIGS. 4 and 5 with a holding device removed.
Figure 5:
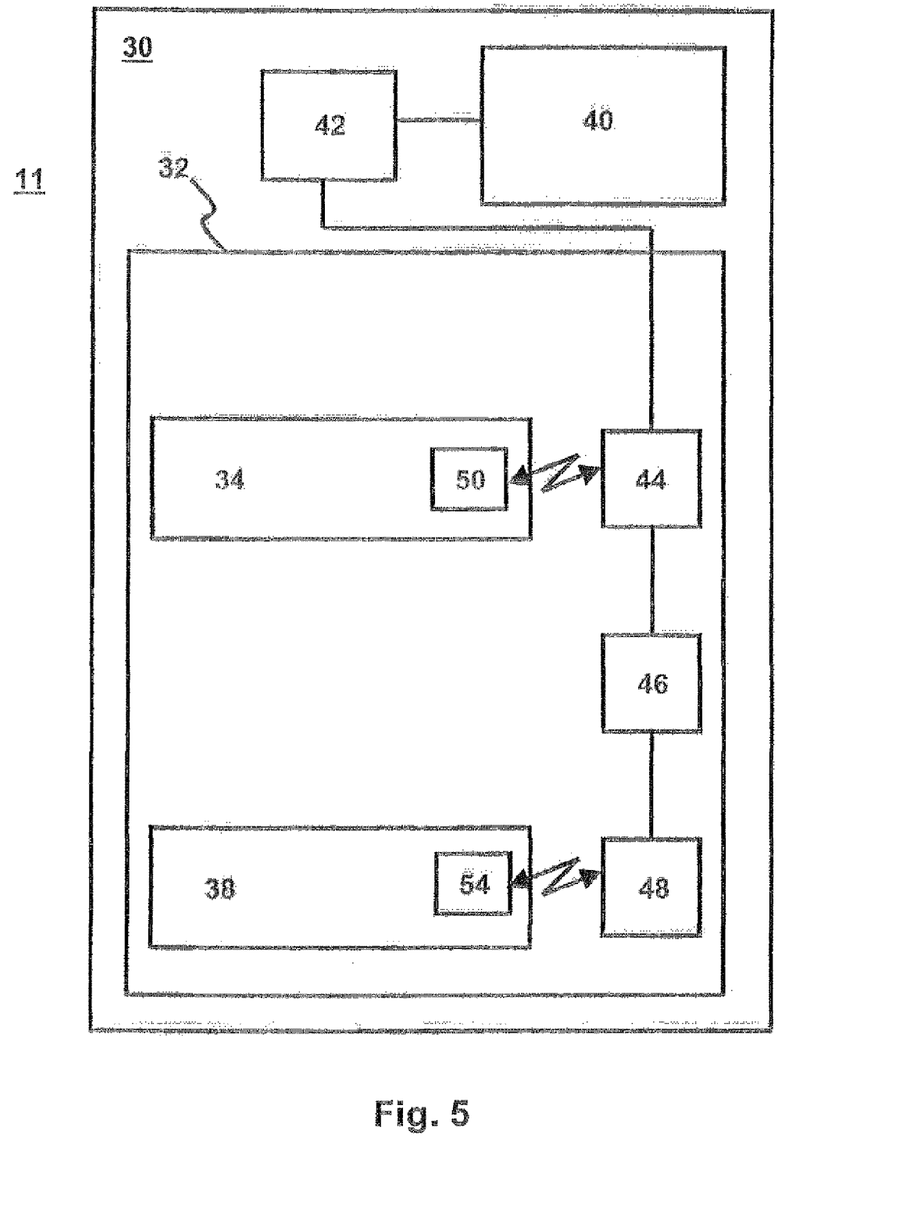

The trolley 30 shown schematically in FIGS. 3 to 5 comprises a door 32, wherein FIGS. 3 and 5 show the trolley with the door 32 open and FIG. 4 shows the trolley 30 with the door 32 closed. The trolley 30 comprises a plurality of holding devices 34, 36 and 38. The holding devices 34, 36 and 38 are holding devices insertable into or removable from compartments, which devices are designed to hold foods. In particular, the foods taken up by the holding devices 34, 36 and 38 can be heated and/or cooled in the trolley 30.

The system integrated in the trolley 30 for displaying written information comprises a display unit 40, a control unit 42 for activating the display unit 40, three readers 44, 46, 48 and three RFID transponders 50, 52, 54. Fitted to each of the holding devices 34, 36 and 38 is an RFID transponder 50, 52, 54. The system has respective readers 44, 46, 48 corresponding to the number of holding devices 34, 36 and 38 and RFID transponders 50, 52, 55. The readers 44, 46, 48 acquire whether the holding devices 34, 36, 38 are located with the RFID transponders 50, 52, 54 in the respective compartments. The RFID transponders 50, 52, 54 can also transmit information to the readers 44, 46, 48 in respect of the foods located on the holding devices 34, 36, 38. Signals acquired by the readers 44, 46, 48 are forwarded to the control unit 42, which controls the display unit 40 on the basis of the signals acquired.

With reference to FIGS. 1 to 5, the display unit 40 can correspond to the display unit 18, the control unit 42 to the control unit 16, each of the acquiring units 44, 46, 48 to the WLAN receiver 14, and each of the RFID transponders 50, 52, 54 to the WLAN transmitter 12. For this reason, a detailed description of the units 40, 42, 44, 46, 48, 50, 52 and 54 of the system for displaying information that is integrated in the trolley 30 is dispensed with.

FIG. 4 shows the state of the trolley 30 when the door 32 is closed. For better insulation and a low-cost construction, no viewing window is provided in the door 32. In this state a flight attendant cannot tell which holding devices 34, 36, 38 are located in the trolley 30 or with which foods the holding devices 34, 36, 38 are loaded. As is evident from FIG. 3, corresponding information of the RFID transponders 50, 52 54 is read by the readers 44, 46, 48 and forwarded to the control unit 42. The display unit 40 can then display written information corresponding to the loading status of the trolley 30 on the display unit 40. The display device 40 can thus display, for example, which holding devices 34, 36, 38 are located in the trolley 30, and/or that there are fish dishes on the holding device 34, meat dishes on the holding device 36 and desserts on the holding device 38.

As in the embodiment of FIGS. 1 and 2, this information can be displayed alternately in different languages on the display unit 40. Thus, according to the embodiment of FIGS. 1 and 2, passenger and departure and/or arrival location information can be transmitted to the readers 44, 46, 48, so that the display unit 40 displays the information in the corresponding languages. For example, the display unit 40 can show the display fish dishes, meat dishes and desserts alternately (in particular alternating with various time intervals) in English and Chinese.

If, as shown in FIG. 5, the holding device 36 with the meat dishes is removed from the trolley 30, the reader 46 realises that the RFID transponder 52 is no longer in its vicinity. The display unit 40 accordingly displays in the closed state of the trolley shown in FIG. 4 that only the holding device 34 with the fish dishes and the holding device 38 with the desserts are still located in the trolley 30. For this reason, the flight attendant always has an overview in real time of which holding devices 34, 36, 38 and foods are located in the trolley 30. Opening of the door 30 to check can thus be avoided. This is especially advantageous if the trolley 30 is used for heating or cooling the foods in addition to transporting foods. In this case an interest exists in keeping the duration of opening of the door 32 short, so that an escape of heat or cold into the interior of the aircraft cabin 11 is avoided.

The invention claimed is:

1. A method for displaying information on an electrical display unit in an aircraft cabin, the method comprising;
   generating at least one signal unambiguously identifying the information,
   acquiring, in particular wirelessly acquiring, the at least one signal,
   controlling the display unit on the basis of the at least one signal,
   displaying the information on the electrical display unit,
   acquiring at least one of departure and arrival location information of a flight, and
   displaying the information depending on the at least one of the departure and arrival location information acquired in different languages, wherein:
   the acquiring of the at least one of departure and arrival location information is automaticallyried out by a computer system based on a flight route for navigation of the flight that has been entered into the computer system by a pilot.

2. The method according to claim 1, wherein the information is written information and the display on the display unit comprises;
   displaying the written information in different languages, in particular alternating between different languages.

3. The method according to claim 2, further comprising;
   acquiring passenger information and
   displaying the written information in different languages depending on the acquired passenger information.

4. The method according to claim 3, wherein the display unit is mounted on a passenger seat and the written information is displayed in different languages depending on the acquired passenger information of a passenger assigned to the passenger seat.

5. The method according to claim 3, further comprising:
   controlling of a display duration of the written information in the respective language depending on the acquired information.

6. The method according to claim 1, further comprising:
   generating the at least one signal unambiguously identifying the information by a transponder, which is fitted to a holding device in a transport container,
   wireless acquiring the at least one signal by a reader, which is fitted in the transport container and
   displaying the information on the display unit, which is mounted on the outside of the transport container.

7. A system for displaying information on an electrical display unit in an aircraft cabin, the system comprising:
   an electrical display unit, which is structured to display the information,
   a generating unit, which is structured to generate at least one signal unambiguously identifying the information,
   a first acquiring unit, which is structured to acquire the at least one signal, in particular wirelessly,
   a control unit, which is structured to control the display unit on the basis of the at least one signal, and
   a second acquiring unit for automatically acquiring at least one of departure and arrival location information of a flight based on a flight route for navigation of the flight that has been entered into a computer system by a pilot, wherein;
   the second acquiring unit is adapted structured to generate the at least one signal unambiguously identifying the information in different languages depending on the at least one of the acquired departure and arrival location information.

8. The system according to claim 7, wherein the control unit is structured to control the display unit such that this displays the information in different languages, in particular alternating between different languages.

9. The system according to claim 8, further comprising a third acquiring unit for acquiring passenger information, wherein the third acquiring unit is structured to generate the at least one signal unambiguously identifying the information in different languages depending on the acquired passenger information.

10. The system according to claim 9, wherein the display unit is mounted on a passenger seat and the acquired passenger information comprises a correlation between a passenger seat and a passenger nationality or passenger language.

11. The system according to claim 9, wherein the generating unit is adapted to generate a time control signal depending on the acquired information, which signal comprises a display duration of the information in the respective language on the display unit.

12. The system according to claim 7, further comprising a transport container with at least one holding device, wherein the generating unit is a transponder, which is fitted to the holding device in the transport container, the first acquiring unit is a reader, which is fitted in the transport container and acquires the at least one signal wirelessly, and the display unit is mounted on the outside of the transport container.

13. The system according to claim 7, wherein the display unit is an OLED display.

* * * * *